United States Patent [19]
Guay

[11] Patent Number: 4,787,255
[45] Date of Patent: Nov. 29, 1988

[54] TORQUEMETER

[75] Inventor: Normand Guay, Boucherville, Canada

[73] Assignee: Centre de Recherche Industrielle du Québec and Consulab Inc., Ste-Foy and Beauport, Canada

[21] Appl. No.: 33,195

[22] Filed: Apr. 2, 1987

[51] Int. Cl.⁴ ............................................. G01L 3/10
[52] U.S. Cl. .............................................. 73/862.34
[58] Field of Search ................................. 73/862.34

[56] References Cited

U.S. PATENT DOCUMENTS

| | | |
|---|---|---|
| 2,947,168 | 8/1960 | Yang ........................... 73/862.34 |
| 3,142,981 | 8/1964 | Gross . |
| 3,170,323 | 2/1965 | Kuhrt et al. ................. 73/862.34 |
| 3,580,352 | 5/1971 | Hestad et al. ............ 73/862.33 X |
| 3,751,975 | 8/1973 | Katsura . |
| 3,871,215 | 3/1975 | Pratt, Jr. et al. . |
| 3,935,733 | 2/1976 | Schindler ................. 73/862.34 X |
| 4,208,904 | 6/1980 | Schindler ..................... 73/862.34 |
| 4,448,084 | 5/1984 | Dobler et al. . |
| 4,513,626 | 4/1985 | Obayashi et al. . |

FOREIGN PATENT DOCUMENTS 2231571  1/1974  Fed. Rep. of Germany ... 73/862.34

*Primary Examiner*—Charles A. Ruehl
*Attorney, Agent, or Firm*—Cushman, Darby & Cushman

[57] ABSTRACT

The present invention relates to a device for detecting and measuring torque transmitted from a prime mover to a rotary machine acting as a load. The device includes a torsion shaft through which the torque is transmitted and as a result it is slightly twisted about its axis. A pair of recording mediums are mounted at spaced locations on the torsion shaft. On each recording medium is permanently recorded a periodic signal. A pair of reading head are used to detect the signal on one of the recording mediums while a single reading head is employed to detect the signal on the other recording medium. The output signals generated by the reading heads are processed by a microcomputer to derive the torque information and the direction of rotation of the torque shaft.

9 Claims, 2 Drawing Sheets

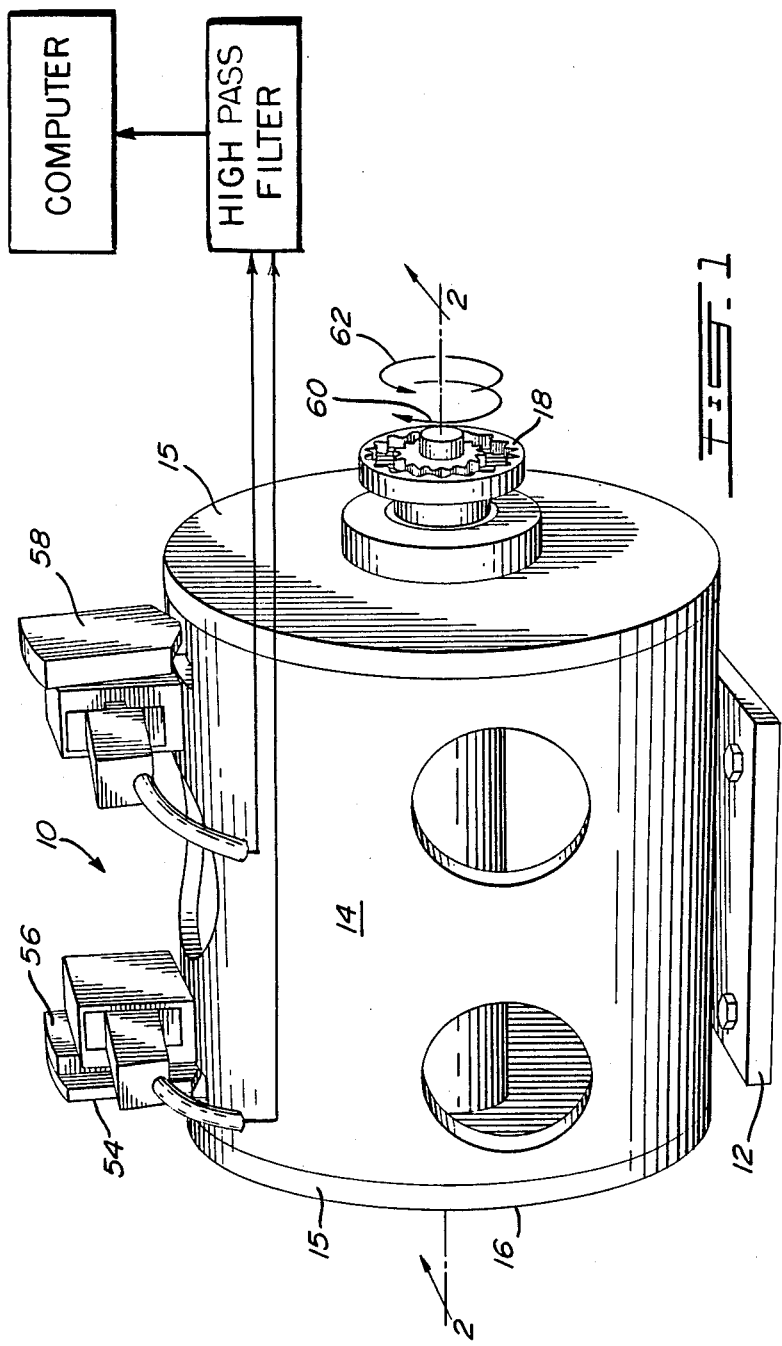

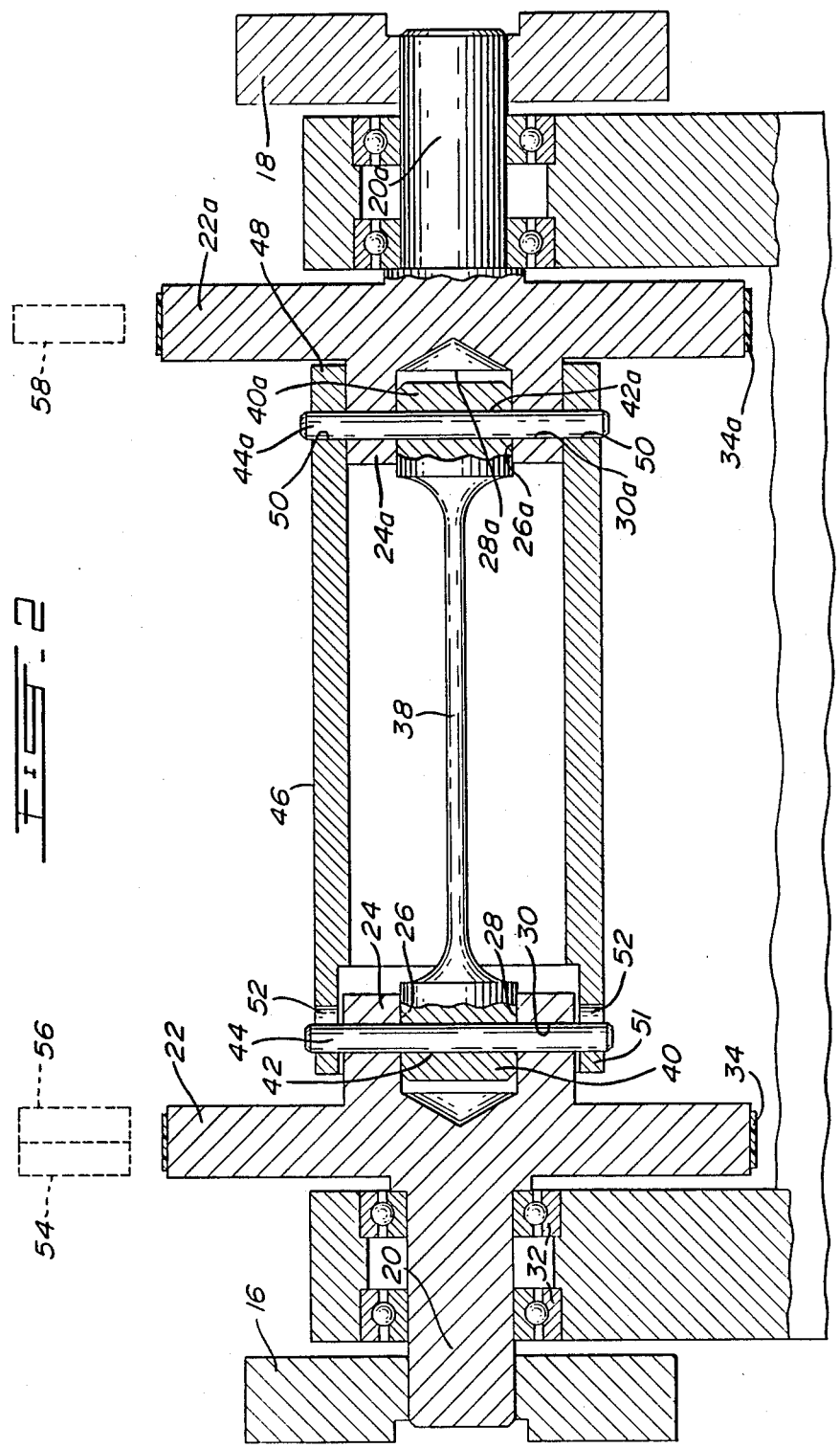

TORQUEMETER

The present invention relates to measuring devices and refers more specifically to an apparatus for detecting torque transmitted between the rotor of a prime mover and the rotor of a load, used in conjunction with signal processing devices to measure the torque.

Devices for detecting and measuring torque applied by the drive shaft of a prime mover such as an electric motor, an internal combustion engine or the like, to a rotary machine acting as a load, are well known and widely used either for educational purposes or to provide torque information to a control system regulating the operation of the prime mover.

Most types of torque detectors employ a thin and flexible shaft which when submitted to a torque is slightly twisted about its axis. The twist angle is measured by using markings formed on axially spaced locations on the shaft to determine the torque.

As a more specific example, the U.S. Pat. No. 3,871,215 to PRATT, Jr. et el, granted on Mar. 18, 1975 discloses a torque measuring device wherein the twist angle of a shaft is obtained by using a light modulation scheme, the modulated light providing electric signals from which the torque information is derived.

Furthermore, the U.S. Pat. No. 3,935,733 to SCHINDLER, issued on Feb. 3, 1976 relates to another type of torque measuring device in which the twist angle of a shaft is measured on the basis of the phase difference between two periodic signals recorded on magnetic tapes mounted on the twistable shaft at axially spaced locations thereon.

The present invention is an improvement over the existing torque detectors and torque measuring device.

The torque detector, according to the present invention, comprises a thin and flexible shaft which has one end adapted to be connected in driving relationship with the rotor of a prime mover, such as a motor, and has an opposite end adapted to be operatively connected to the rotor of a load, driven by the prime mover, the flexible shaft acting as a transmission shaft between the two rotors.

The torque detector also includes a pair of recording mediums, such as magnetic tapes which are mounted to the flexible shaft at axially spaced locations thereon. In a preferred embodiment, each magnetic tape is mounted on the periphery of a collar which is attached at a respective end of the flexible shaft. A periodic signal, such as a sinusoidal signal, is permanently recorded on each magnetic tape.

A pair of reading heads are mounted adjacent the periphery of one of the collars to detect the periodic signal and generate two independent output signals. Preferably, a single reading head is used to detect the periodic signal recorded on the magnetic tape mounted on the other collar.

When torque is applied from the rotor of a prime mover to the rotor of a load, through the flexible shaft of the torque detector, the twist angle in the flexible shaft which is proportional to the torque will produce a phase difference between the periodic signals recorded on the two magnetic tapes. By processing the output signals from the reading heads, the phase difference may be evaluated and the torque information may be derived.

The torque detector is operatively connected to a microcomputer to form a torque measuring device. The task of the microcomputer is to process the output signals from the reading heads to calculate the phase shift between the signals and thus, determine the value of the torque.

The two reading heads arrangement for detecting the periodic signal associated with one of the collars allows to determine the direction of rotation of the rotors. Whether one of the output signals lags or leads the other signal permits to determine if the rotors turn in a clockwise or a counterclockwise direction.

This feature renders the torque measuring device simple and easy to use, leaving the task to the microcomputer to determine the magnitude of the torque applied as well as which one of the rotors supplies the power, according to the twist angle and the direction of rotation.

In a preferred embodiment, the output signals generated by the reading heads are filtered by a high pass filter prior being fed to the microcomputer. This arrangement improves the accuracy of the torque measuring device in that it stabilizes the output signals from the reading heads as it will be explained in details in the description of a preferred embodiment given hereinafter.

Therefore, the present invention comprises in a general aspect a device for detecting torque, comprising:

a supporting structure;

a torsion shaft rotatably mounted to the supporting structure, the torsion shaft being adapted to transmit the torque to be detected, the torque producing a twist in the torsion shaft;

a first and a second recording mediums mounted at axially spaced locations on the torsion shaft, a periodic signal being recorded on the first and second recording mediums;

a first and a second signal detecting means mounted to the supporting structure and associated respectively with the first and second recording mediums for detecting the periodic signals and generating in turn output signals, the first signal detecting means including a pair of spaced apart sensors each adapted to detect the periodic signal recorded on the first recording medium and generate in turn an output signal, the twist producing a phase shift between the output signals of the first and second signal detecting means, the phase shift being representative of the torque, the first and second signal detecting means being adapted to be operatively connected to electronic means for processing the output signals generated thereby and measure the phase shift in order to determine the torque, the electronic means also processing the output signals from the pair of spaced apart sensors to determine the direction of rotation of the torsion shaft.

The present invention also comprehends a device for measuring torque, comprising:

a torque detector, including:

(a) a supporting structure;

(b) a torsion shaft rotatably mounted to said supporting structure, said torsion shaft being adapted to transmit the torque to be measured, said torque producing a twist in said torsion shaft;

(c) a first and a second recording mediums mounted at axially spaced locations on said torsion shaft, a periodic signal being recorded on said first and second recording mediums; and (d) a first and a second signal detecting means mounted to said supporting structure and associated respectively with said first and second recording mediums for detecting the periodic signals and generating in turn output signals, said twist producing a phase shift between the output signals of said first and second signal detecting means, said phase shift being representative of said torque;

high pass filter means operatively connected to said first and second signal detecting means for filtering the output signals generated by said first and second signal detecting means; and computer means operatively connected to said high pass filter means for receiving and processing the filtered output signals to calculate said phase shift for, in turn, determining said torque.

A preferred embodiment of the present invention will now be described with reference to the annexed drawings in which:

FIG. 1 is a perspective view of a torque detecting device, according to the present invention; and FIG. 2 is a cross-sectional view taken along lines 2—2 of FIG. 1, some elements being omitted for clarification.

Referring to the drawings, more particularly to FIG. 1, the torque detecting device according to this invention, identified by the reference numeral 10, has an overall cylindrical shape and is mounted on a suitable support 12. The torque detector 10 comprises a cylindrical casing 14 provided with end walls 15 whic is used to ensure the structural rigidity of the assembly as well as to protect the internal components of the torque detector 10.

From the end walls 15 extend couplings 16 and 18 to be connected respectively to the rotor of a prime mover and to the rotor of a load.

Referring to FIG. 2, which illustrates in a more detailed manner the internal structure of the torque detecting device 10, the coupling member 16 is mounted at one end of a shaft 20 integrally formed with a disc member 22 having a diameter substantially larger than the diameter of coupling 16. On the disc member 22 is also formed an annular projection 24 with a central recess 26 defining a socket 28. The projection 24 is also provided with a hole 30 which extends transversely to the recess 26.

Disc member 22 is mounted for rotation with respect to the casing 14 by a pair of roller bearings 32 which receive the shaft 20.

On the periphery of disc member 22 is mounted a magnetic tape 34 on which is recorded a periodic signal, preferably of sinusoidal nature.

Coupling member 18 is mounted on the shaft of a disc member 22a which is identical to the disc member 22 and, for that reason, it will not be described in details here. The elements of disc member 22a which correspond to those of disc member 22, are identified by the same reference numerals followed by the suffix "a".

A torsion shaft 38 which is relatively thin and is made of an elastic material such as steel is mounted between disc members 22 and 22a. At the extremities of the torsion shaft 38 are formed enlargements or headsd 40, 40a, respectively. For simplicity, since the heads 40 and 40a are identical, only the head 40 will be described, the elements of the head 40a identical to those of the head 40 will bear the same reference numerals followed by the suffix "a". The head 40 is deeply received within the socket 28 which is cross-drilled to form an opening 42 in register with the opening 30 for receiving a locking pin 44 preventing an unwanted removal of the head 40 from the socket 28.

A metallic sleeve 46 is mounted between disc members 22 and 22a and extends coaxially with respect to the torsion shaft 38.

The annular projection 24a is received within the metallic sleeve 46 at one end thereof which is designated by the reference numeral 48. A pair of openings 50, adjacent the extremity 48 are formed on the sleeve 46 for receiving the locking pin 44a therethrough.

The annular projection 24 is received within the metallic sleeve 46, at the opposite end thereof, indicated at 51.

A pair of slots 52 are formed on the metallic sleeve 46, adjacent the extremity 51, to receive the locking pin 44. The slots 52 extend in a circumferential direction with respect to the metallic sleeve 46.

The inner diameter of the metallic sleeve 46, at the extremity 51 is slightly enlarged so as to create a loose fit with the projection 24 allowing the disc member 22 to rotate within limits with respect to the sleeve 46, by twisting the shaft 38, the extremities of the pin 44 moving in the slots 52. The length of the slots 52 determine the permissible amplitude of the movement between disc member 22 and the cylinder 46 which is calculated to avoid overtwisting the shaft 38.

Referring momentarily to FIG. 1, a pair of reading heads 54 and 56 (shown in phantom lines in FIG. 2) are mounted to the casing 14, adjacent the periphery of disc member 22 for detecting the sinusoidal signal on the magnetic tape 34 in order for each to produce an output signal. The heads 54 and 56 which are Hall effect sensors are spaced from each other by a distance corresponding to a quarter of a period of the signal recorded on the magnetic tape 34.

A single reading head 58 (also shown in phantom lines in FIG. 2) which also is a Hall effect sensor is mounted on the casing 14, adjacent the disc member 22a for detecting the signal recorded on tape 34a.

The operation of the torque detecting device 10, according to the present invention, is as follows.

The drive shaft of a prime mover which may be an electric motor, an internal combustion engine or the like, is connected to one of the coupling 16 or 18 and the shaft of a load which may be a pump, a generator or the like is connected to the opposite coupling. As an example, the prime mover may be connected to the coupling 16 and the load is connected to the coupling 18.

The torque from the prime mover to the load is transmitted through the torque detecting device 10, more specifically by the torsion shaft 38 which, then, is slightly twisted about its axis, the twist angle being proportional to the amplitude of the torque applied.

The twist angle creates a phase shift between the output signals generated by the reading heads 54 and 56 and the reading head 58. To determine the phase shift between the output signals in order to derive the torque information, the output signals from the reading heads 54, 56 and 58 are fed to a microcomputer operating according to a certain program, whose task is to calculate the torque transmitted from the prime mover to the load.

The torque detector 10 defines in combination with a microcomputer a torque measuring device.

The microcomputer and the program which calculates the torque do not form part of this invention and, for that reason, they will not be described in details here. It should be understood that different type of microcomputers may be used with the torque detector according to this invention and also a variety of programs may be written to calculate the torque, from the output signals of the heads 54, 56 and 58 by determining the phase shift between the output signals.

The output signals from the reading heads 54 and 56 are used to determine the direction of rotation of the disc members 22 and 22a. Taking as a reference the output signal from the head 56, if the output signal from the head 54 lags the signal from the head 56, the disc members 22 and 22a rotates clockwise, in the direction of the arrow 60. However, if the signal from the head 54 leads the signal from the head 56, then, the disc members 22 and 22a rotate a counter clockwise direction, as shown by the arrow 62.

This information is useful in conjunction with the sign of the phase shift between the signals from the heads 54 and 56 and the head 58 in order to determine to which one of the couplings 16 or 18, the prime mover is connected.

For example, when the disc members 22 and 22a rotate in a clockwise direction as shown by the arrow 60 and the output signal from the reading head 58 lags the output signals of the heads 54 and 56, the prime mover is connected to the coupling 16 and transmits the torque toward the coupling 18.

When the disc members 22 and 22a rotate in a counter clockwise direction as shown by the arrow 62 and the signal of the head 58 leads the signals from the heads 54 and 56, then, the prime mover is connected to the coupling 18.

In a variant, each of the reading heads 54, 56 and 58 of the torque measuring device according to this invention is connected to a high-pass filter wherein the output signals generated by the reading heads are filtered before being applied to the microcomputer. This arrangement improves the accuracy of the torque measuring device.

The position of a periodic signal generated by a reading head be it the reading head 54, 56 or 58 with respect to a reference voltage level depends upon the gap 64 between the reading head and the magnetic tape. Therefore, in order to obtain a stable output signal, intersecting the reference voltage level at equidistant intervals, the gap 64 must remain constant. This requirement, however, is practically difficult to achieve since there is always a certain amount of run out in the radial direction in the disc members 22 and 22a on which the magnetic tapes 34 and 34a are mounted. Therefore, the gap 64 is not constant but changes during the rotation of the disc member and as a result, the output signal fluctuates.

Generally speaking, the output signal may be considered as being the sum of two components, the periodic signal recorded on the magnetic tape and a much lower frequency signal whose period corresponds to one revolution of the disc member carrying the magnetic tape.

Since the points at which the output signal crosses the reference voltage level are used as reference marks by the microcomputer to measure the phase shift between the output signals these fluctuations results in a loss of accuracy in the measurements.

By using a high pass filter, the lower frequency component of each output signal is eliminated, or at least strongly attenuated, thus improving the accuracy of the torque measuring device.

The specific structure of the high-pass filter is not essential to the invention because a variety of different filters may be used and the details as to their construction may be obtained from the literature.

For example, filters constructed from passive components such as capacitors and resistors may be employed. Such filters are unexpensive but they have a major drawback in that a sharp cut-off characteristic may be obtained only at the expense of a strong signal attenuation which obviously is undesirable.

The active filters do not have this drawback and while they are more expensive, the cost increase is largely compensated by their flexibility allowing one to tailor the filter precisely to the characteristics of the torque detector.

Once the configuration of the high-pass filter has been selected, its characteristics are determined according to the operating conditions of the torque detecting device 10. The filter should have the sharpest cut-off response possible set at the highest number of revolutions per second that the disc members 22 and 22a and the torsion shaft 38 are susceptible to reach.

At last, the filter should have the flatest possible frequency response up to the maximum frequency that the output signals generated by the reading heads 54, 56 and 58 can reach.

Although the invention has been described with reference to a specific example, that description should not be interpreted in any limiting manner since this embodiment may be refined or modified in various ways without departing from the spirit of the invention. The scope of the invention is defined in the annexed claims.

The embodiments of the invention in which an exclusive property or privilege is claimed are defined as follows:

1. An apparatus for detecting torque, comprising:
   a supporting structure;
   a torsion shaft rotatably mounted to said supporting structure, said torsion shaft being adapted to transmit the torque to be detected, the torque producing a twist in said torsion shaft;
   first and second recording mediums mounted at axially spaced locations on said torsion shaft, a periodic signal being recorded on said first and second recording mediums;
   a first and a second signal detecting means mounted to said supporting structure and associated respectively with said first and second recording mediums for detecting the periodic signals and generating in turn output signals, said first signal detecting means including a pair of spaced apart sensors each adapted to detect the periodic signal associated with said first recording medium and generate in turn an output signal, said twist producing a phase shift between the output signals of said first and second signal detecting means, said phase shift being representative of the torque, electronic means adapted to be operatively connected to said first and second signal detecting means for processing the output signals generated thereby and for measuring the phase shift in order to determine the torque, said electronic means also processing the output signals from said pair of spaced apart sensors to determine the direction of rotation of said torsion shaft; and
   high pass filter means for filtering the output signals generated by said first and second signal detecting means before such signals are processed by said electronic means.

2. A device as defined in claim 1, wherein each recording medium is constituted by a magnetic tape having an annular shape.

3. A device as defined in claim 1, wherein each magnetic annular tape is mounted on a circular member that is coaxially mounted to said torsion shaft.

4. A device as defined in claim 3, further comprising stop means mounted to one of said circular members for preventing excessive twisting of said torsion shaft.

5. A device as defined in claim 1, wherein said second signal detecting means comprises a single sensor.

6. A device as defined in claim 5, wherein the sensors of said first and second signal detecting means are Hall effect sensors.

7. A device for measuring torque, comprising:
a torque detector including;
a supporting structure;
a torsion shaft rotatably mounted to said supporting structure, said torsion shaft being adapted to transmit torque that is to be measured, the torque producing a twist in said torsion shaft;
first and second recording mediums mounted at axially spaced locations on said torsion shaft, a periodic signal being recorded on said first and second recording mediums;
first and second signal detecting means mounted to said supporting structure and associated respectively with said first and second recording mediums for detecting the periodic signals and generating in turn output signals, the twist producing a phase shift between the output signals of the first and second signal detecting means, the phase shift being representative of the torque;
high pass filter means operatively connected to said first and second signal detecting means for filtering the output signals generated by said first and second signal detecting means; and
computer means operatively connected to said high pass filter means for receiving and processing the filtered output signals to calculate said phase shift for, and in turn determining said torque.

8. A device as defined in claim 7, wherein each recording medium is constituted by a magnetic tape having an annular shape.

9. A device as defined in claim 8, wherein each magnetic annular tape is mounted on a circular member coaxially mounted to said torsion shaft.

* * * * *